Oct. 11, 1960     H. L. VAN DER HORST ET AL     2,956,207

CONTROL CIRCUIT ARRANGEMENT

Filed Jan. 28, 1957                       2 Sheets-Sheet 1

INVENTOR
HAJO LORENS VAN DER HORST
PETER H.G. VAN VLODROP

BY Frank R. Trifari

AGENT

United States Patent Office 2,956,207
Patented Oct. 11, 1960

2,956,207

CONTROL CIRCUIT ARRANGEMENT

Hajo Lorens van der Horst and Peter Hubertus Gerardus van Vlodrop, Eindhoven, Netherlands, assignors, by mesne assignments, to North American Philips Company, Inc., New York, N.Y., a corporation of Delaware Filed Jan. 28, 1957, Ser. No. 636,607

Claims priority, application Netherlands Feb. 22, 1956

5 Claims. (Cl. 315—241)

The present invention relates to a control circuit arrangement. More particularly, the invention relates to a circuit arrangement for controlling the angle of ignition of a gas or vapor filled electron discharge tube. The discharge tube is controlled by means of a capacitor which is charged through a rectifier from a source of alternating current and is subsequently discharged.

In accordance with the present invention, the capacitor is discharged across a parallel-connected resistor and the control circuit of the discharge tube takes the voltage of the discharge curve of the capacitor since at least part of said resistor is included in the control circuit. Thus, the control electrode of the discharge tube has a negative potential with respect to the cathode.

In spite of the simplicity of this circuit arrangement, a regulation of the angle of ignition through more than 180° is possible by varying the several factors of this circuit arrangement.

This control circuit preferably also comprises a positive direct voltage as a bias.

According to another feature of the invention, the resistor is so proportioned as to substantially approach a linear form of the discharge curve of the capacitor.

In order that the invention may be readily carried into effect, it will now be described in detail, by way of example, with reference to the accompanying drawings, wherein.

Figure 1:
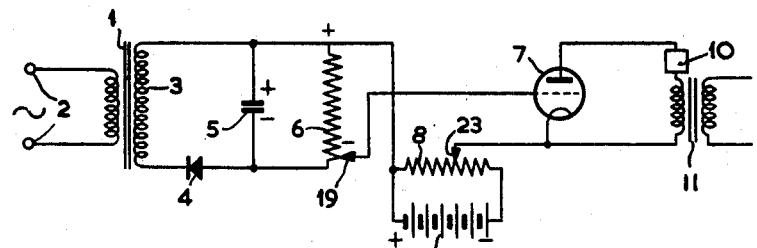
Fig. 1 is a schematic diagram of an embodiment of a control circuit arrangement of the present invention.

In Fig. 1, a transformer 1 is connected to an alternating current power supply source 2, the secondary winding 3 being connected through a rectifier 4 to a capacitor 5. In parallel with the capacitor 5 is connected a resistor 6 which is inserted in the grid circuit of a gas- or vapour-filled discharge tube 7. The grid circuit also comprises a potentiometer 8 and a source of direct voltage 9 so that the grid of the tube 7 can be positively biased. The anode circuit of the tube 7 comprises a load 10 and a supply transformer 11.

Figure 2:
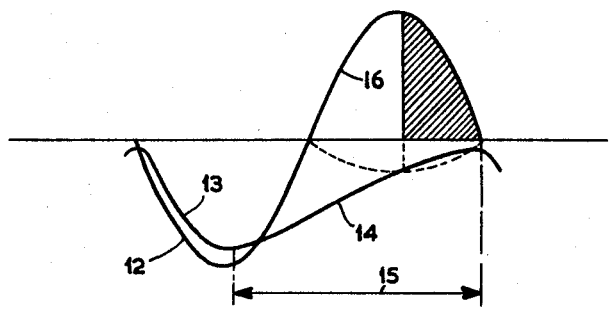
Figs. 2 and 3 are graphical presentations of the ignition characteristics of the controllable discharge tube.

In Fig. 2, the reference numeral 12 designates the alternating voltage of the secondary winding 3. The capacitor is charged according to the curve 13 by the rectifier 4 and subsequently discharged through the resistor 6 according to the curve 14. As may be seen from Fig. 2, during the interval 15 the portion 14 of the curve is approximately linear as a result of a judicious choice of the resistor 6. The curve portion 14 is employed for controlling the tube 7 by regulation of the angle of ignition through more than 180°, said curve portion even approximating 270°. The form of the discharge curve 14 is determined by the secondary voltage 12, the value of the capacitor 5 and the resistor 6 and the value of the impedance of the charging circuit. If the movable contact 23 of the potentiometer 8 is entirely shifted to the left, no positive bias is operated in the control circuit of the tube 7. The anode alternating voltage 16 of the tube 7 in Fig. 2 will then be controlled in phase, for example as shown in the drawing, since the tube 7 ignites at the instant at which the curve 14 intersects the ignition voltage curve of the tube 7 (shown in broken lines). In this case, consequently, a negative ignition voltage curve is required, since the curve 14 proceeds negatively. The curve 14 may, for example, be varied by shifting the contact 19.

Figure 3:
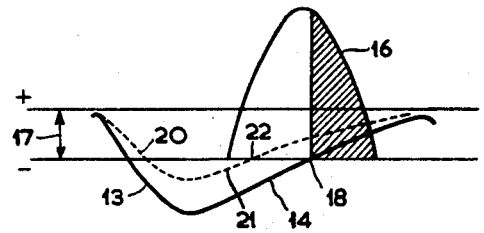

In Fig. 3, the phase-control of the anode alternating voltage 16 of the tube 7 is shown, the ignition voltage curve coinciding with the zero-line. The positive direct voltage 17 of the connected portion of the potentiometer 8 (Fig. 1) is connected, in series with the voltage of the curve 13, 14, with opposite polarity in the control circuit of the tube 7. In Fig. 3, the tube 7 will consequently ignite, for example at 18. If the contact 19 of the resistor 6 (Fig. 1) is moved upward, a smaller amplitude of the curve is obtained and this will consequently have a form, for example as designated by 20 and 21, so that the tube 7 ignites at 22.

Instead of shifting the contact 19, the position of the contact 23 of the potentiometer 8 (Fig. 1) may be shifted so that the positive bias 17 (Fig. 3) is modified and consequently the position of the curve 13, 14, is altered so that a different ignition point of the tube 7 is obtained. Since the used portion 14 of the discharge curve has a substantially linear form, the phase-displacement angle changes substantially linearly with the direct voltage component 17, which would not be the case with a sinusoidal control voltage.

The form of the curve 13, 14 may alternatively be influenced by means of a variable resistor in the charging circuit of the capacitor 5 (Fig. 1), which resistor is not shown for the sake of simplicity, or by a phase-shift of the voltage of the winding 3.

Figure 4:
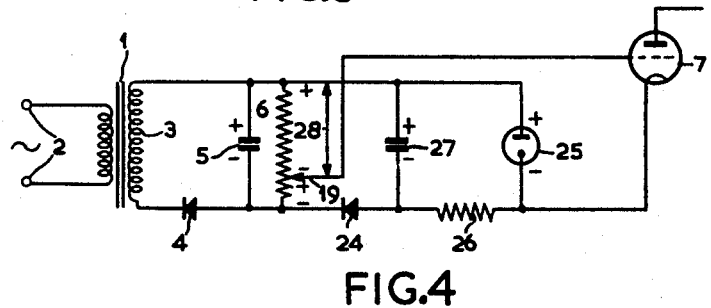
Fig. 4 is a modification of the embodiment of Fig. 1.

Finally, Fig. 4 shows a modification, in which the direct voltage source 9 of Fig. 1 is replaced by the combination of a rectifier 24 in series with a capacitor 27 which are connected in parallel with the resistor 6. (Corresponding parts of the circuit arrangements shown in Fig. 1 and Fig. 4 are provided with the same reference numerals.) Since in this circuit arrangement a constant positive direct voltage is used in the grid circuit of the tube 7, a resistor 26 and a glow-discharge tube 25 are provided for taking up the variable voltage in the case of power supply voltage fluctuations. In this circuit arrangement, consequently, a constant positive bias is obtained for the tube 7 from the glow-discharge tube 25 stabilizing the voltage, and the discharge curve of the capacitor 5 is varied by means of the contact 19. The tapped capacitor voltage 28 is connected with a polarity opposite to that of the positive voltage of the glow-discharge tube 25 in the control circuit comprising the cathode of tube 7, the glow-discharge tube 25, the resistor 6 with a voltage 28 and the grid of tube 7.

If the tube 7 forms part of an alternating current stabilizer, a satisfactory compensation is automatically obtainable in the case of power supply voltage variations by a suitable choice of the form of the curve 14, since an increase in power supply voltage 16 involves an increase in voltage 14 with the result that the ignition point 18 is shifted to the right, hence producing later ignition and decreasing the output voltage.

Figure 5:
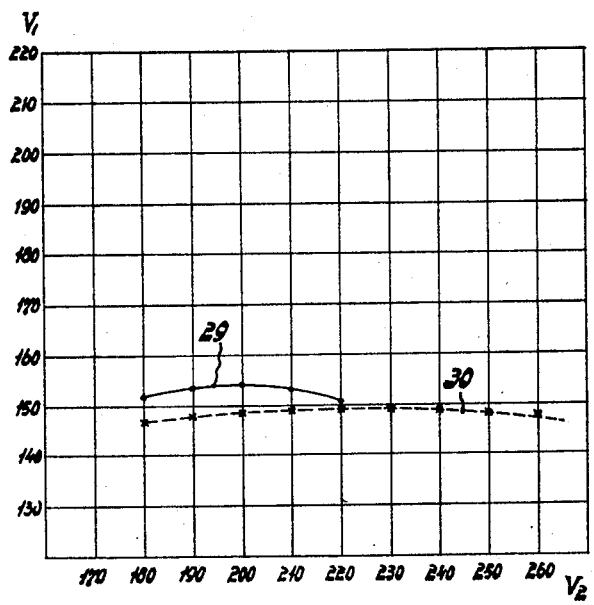
Fig. 5 is a graphical presentation of input and output voltage curves to aid in explaining the operation of the embodiment of Fig. 4.

In Fig. 5, the stabilized output voltage $V_1$ is indicated by the curve 29 as a function of the varying power supply voltage $V_2$ (both expressed in volts) from which it is seen that satisfactory stabilization is obtainable in the aforesaid simple manner. Two antiparallel connected gas- or vapour-filled discharge tubes were each controlled by a control-circuit shown in Fig. 4. The secondary voltage on the winding 3 was 220 v., the value of the capacitor 5 was 150 times $10^{-9}$ farad, the resistor 6 had a value of 50,000 ohms, the capacitor 27 was 8 microfarads and the resistor 26 had a value of 33,000 ohms.

Further improvement in stabilization is obtainable by feeding the primary winding 2 not from the power supply source but at least with a part of the output alternating voltage of the stabilizer. The result is shown by the curve 30 in Fig. 5.

Discharge tubes having a positive ignition characteristic may also be ignited in the aforesaid manner.

What is claimed is:

1. An electrical circuit arrangement comprising a gas filled electron discharge device having a cathode, an anode and a control electrode, an output circuit connected to said anode and comprising means for applying thereto an alternating current of given frequency value, a control circuit connected to said control electrode and comprising input means for an alternating current of said given frequency value, a capacitor, means for charging said capacitor comprising a rectifier connected to said input means, and a resistor element shunting said capacitor, said resistor element having a value at which said capacitor is substantially discharged within the interval of one period of said first-mentioned alternating current.

2. An electrical circuit arrangement as claimed in claim 1 further comprising means for applying an auxiliary positive bias to said control electrode.

3. An electrical circuit arrangement as claimed in claim 1 further comprising a second capacitor and a second rectifier element connected in series circuit arrangement, and means for connecting said series circuit arrangement in shunt with said first mentioned capacitor.

4. An electrical circuit arrangement as claimed in claim 3 comprising means for stabilizing the voltage of said second capacitor comprising a glow discharge tube and a resistor connected in series circuit arrangement and in shunt with said second capacitor.

5. An electrical circuit arrangement comprising a gas filled electron discharge device having a cathode, an anode and a control electrode, an output circuit connected to said anode and comprising means for applying thereto an alternating current of given frequency value, a control circuit connected to said control electrode and comprising input means for an alternating current of said given frequency value, a capacitor, means for charging said capacitor comprising a rectifier connected to said input means and a resistor element shunting said capacitor, said capacitor and said resistor element having values at which said capacitor is substantially linearly discharged within the interval of one period of said first mentioned alternating current.

References Cited in the file of this patent

UNITED STATES PATENTS

| | | |
|---|---|---|
| 2,201,166 | Germeshausen | May 21, 1940 |
| 2,478,901 | Edgerton | Aug. 16, 1949 |
| 2,607,902 | Townsend | Aug. 19, 1952 |